United States Patent
Imanishi et al.

(10) Patent No.: US 8,263,278 B2
(45) Date of Patent: Sep. 11, 2012

(54) FUEL CELL SYSTEM AND ITS OPERATION METHOD

(75) Inventors: Hiroyuki Imanishi, Toyota (JP); Kota Manabe, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 796 days.

(21) Appl. No.: 12/442,642

(22) PCT Filed: Sep. 27, 2007

(86) PCT No.: PCT/JP2007/069405
§ 371 (c)(1),
(2), (4) Date: Mar. 24, 2009

(87) PCT Pub. No.: WO2008/047603
PCT Pub. Date: Apr. 24, 2008

(65) Prior Publication Data
US 2010/0047630 A1  Feb. 25, 2010

(30) Foreign Application Priority Data
Oct. 20, 2006  (JP) .................. 2006-286219

(51) Int. Cl.
H01M 8/04  (2006.01)
(52) U.S. Cl. ...................................... 429/432

(58) Field of Classification Search ............ 429/432
See application file for complete search history.

(56) References Cited

U.S. PATENT DOCUMENTS

| 7,867,662 B2 * | 1/2011 | Ojima et al. .............. 429/432 |
| 7,879,502 B2 * | 2/2011 | Lienkamp et al. .......... 429/432 |
| 8,092,946 B2 * | 1/2012 | Kawase .................. 429/432 X |

FOREIGN PATENT DOCUMENTS

| JP | S64-038969 A | 2/1989 |
| JP | 2002-500421 A | 1/2002 |
| JP | 2002-313388 A | 10/2002 |
| JP | 2003-504807 A | 2/2003 |
| JP | 2003-288926 A | 10/2003 |
| JP | 2005-527943 A | 9/2005 |
| JP | 2006-073501 A | 3/2006 |

OTHER PUBLICATIONS

Computer-generated English translation of JP 2002-313388, from Japanese Patent Office website (doc date Oct. 2002).*

* cited by examiner

*Primary Examiner* — Stephen J. Kalafut
(74) *Attorney, Agent, or Firm* — Kenyon & Kenyon LLP

(57) ABSTRACT

A fuel cell system includes: a fuel cell which generates electricity; and control means which supplies an output power from the fuel cell to a predetermined load power source while realizing a low-efficiency operation of the fuel cell, thereby driving and controlling the load power source. The control means sets the output voltage of the fuel cell during the low-efficiency operation to a value not smaller than the minimum drive voltage of the load power source.

7 Claims, 5 Drawing Sheets

FUEL CELL SYSTEM AND ITS OPERATION METHOD

This is a 371 national phase application of PCT/JP2007/069405 filed 27 Sep. 2007, which claims priority to Japanese Patent Application No. 2006-286219 filed 20 Oct. 2006, the contents of which are incorporated herein by reference.

TECHNICAL FIELD

The present invention relates to a fuel cell system and its operation method.

BACKGROUND ART

Heretofore, a fuel cell system including a fuel cell for receiving the supply of a reactant gas (a fuel gas and an oxidizing gas) to generate electricity has been suggested and put to practical use. At present, there has been suggested a technology in which a low-efficiency operation (an operation in a state of a power generation efficiency lower than that of a normal operation) of the fuel cell is performed to convert the energy of the supplied reactant gas into more thermal energy, thereby raising the temperature of the fuel cell.

The low-efficiency operation of the fuel cell is frequently performed "during starting" or "during stopping" of the fuel cell for a purpose of warming up the fuel cell under a low-temperature environment. Moreover, in recent years, there has been disclosed a technical concept that the low-efficiency operation is performed even when the temperature of the fuel cell is lower than a predetermined temperature "during the normal operation" (e.g., see Japanese Patent Application Laid-Open No. 2006-73501).

DISCLOSURE OF THE INVENTION

However, "during the normal operation" of a fuel cell, power is supplied from the fuel cell to a predetermined load power source (e.g., a motor for driving a vehicle). Therefore, if a low-efficiency operation is performed in the same manner as in a conventional example to prioritize the temperature rise of the fuel cell, the power cannot sufficiently be supplied to the load power source, and it might be difficult to drive the load power source.

The present invention has been developed in view of such a situation, and an object thereof is to provide a fuel cell system capable of realizing both the driving of a load power source and warm-up by a low-efficiency operation.

To achieve the above object, a fuel cell system according to the present invention is a fuel cell system comprising: a fuel cell which generates electricity; and control means for supplying an output power from the fuel cell to a predetermined load power source while realizing a low-efficiency operation of this fuel cell, thereby driving and controlling this load power source, wherein the control means sets the output voltage of the fuel cell during the low-efficiency operation to a value not smaller than the minimum drive voltage of the load power source.

Moreover, an operation method according to the present invention is an operation method of a fuel cell system including a fuel cell which generates electricity, the method comprising a step of supplying an output power from the fuel cell to a predetermined load power source while realizing a low-efficiency operation of the fuel cell, thereby driving and controlling this load power source, wherein this step sets the output voltage of the fuel cell during the low-efficiency operation to a value not smaller than the minimum drive voltage of the load power source.

When such constitution and method are employed, the low-efficiency operation of the fuel cell can be realized in a state in which the output voltage of the fuel cell is set to the value not smaller than the minimum drive voltage of the predetermined load power source (e.g., a motor for driving a vehicle). Therefore, both the driving of the load power source and the warm-up by the low-efficiency operation can be realized.

In the above fuel cell system, it is preferable to employ the control means for setting the output voltage of the fuel cell during the low-efficiency operation to the minimum drive voltage of the load power source.

In this case, while securing the minimum drive voltage for driving the load power source, the maximum temperature raising effect by the low-efficiency operation can be obtained.

Moreover, in the above fuel cell system, it is preferable to employ control means for controlling the output power of the fuel cell in response to an output demand from the load power source and for changing the output power while keeping a constant output voltage of the fuel cell in a case where the output demand from the load power source changes.

When such a constitution is employed, the output voltage of the fuel cell can be kept constant even in a case where the output voltage of the fuel cell is changed in accordance with the change of the output demand from the load power source. Therefore, the generation of electricity charge or discharge due to the change of the output voltage of the fuel cell can be suppressed, so that the precision of the output power control of the fuel cell can be improved. Moreover, even when the output demand from the load power source changes, the output voltage of the fuel cell can be kept at the minimum drive voltage as it is, so that the maximum temperature raising effect by the low-efficiency operation can constantly be obtained.

Moreover, in the fuel cell system, there can be employed the control means for setting the output voltage of the fuel cell to a value less than the minimum drive voltage of the load power source to realize the low-efficiency operation in a case where it is judged that there is not any output demand from the load power source.

When such a constitution is employed and there is not any output demand from the load power source, the output voltage of the fuel cell can be set to the value less than the minimum drive voltage of the load power source to realize the low-efficiency operation. Therefore, the power energy used for driving the load power source can be converted into thermal energy and effectively utilized to efficiently perform the warm-up, and a temperature raising time can be shortened.

Moreover, in the fuel cell system, the vehicle driving motor can be employed as the load power source, and selection means for selecting an operation mode of the vehicle driving motor may be provided. In such a case, it is possible to employ the control means for judging that there is not any output demand from the vehicle driving motor, when the operation mode of the vehicle driving motor selected by the selection means is a neutral mode or a parking mode.

Furthermore, in the fuel cell system, it is preferable to employ the control means for continuing to drive and control the vehicle driving motor, when the operation mode of the vehicle driving motor selected by the selection means is a neutral mode or a parking mode and the back electromotive voltage of the vehicle driving motor is larger than a predetermined reference voltage.

In a case where such a constitution is employed, when the operation mode of the vehicle driving motor is the neutral mode or the parking mode but the back electromotive voltage of the vehicle driving motor is larger than the predetermined reference voltage (e.g., a system voltage during the low-efficiency operation), driving and controlling of the vehicle driving motor can be continued. In consequence, the damage of an inverter due to the back electromotive voltage of the vehicle driving motor or the like can be suppressed.

According to the present invention, there can be provided the fuel cell system capable of realizing both the driving of the load power source and the warm-up by the low-efficiency operation.

BEST MODE FOR CARRYING OUT THE INVENTION

Hereinafter, a fuel cell system according to an embodiment of the present invention will be described with reference to the drawings. In the present embodiment, an example in which the present invention is applied to a car-mounted power generation system of a fuel cell vehicle will be described.

First, a constitution of a fuel cell system 1 according to the embodiment of the present invention will be described with reference to FIGS. 1 to 3.

Figure 1:
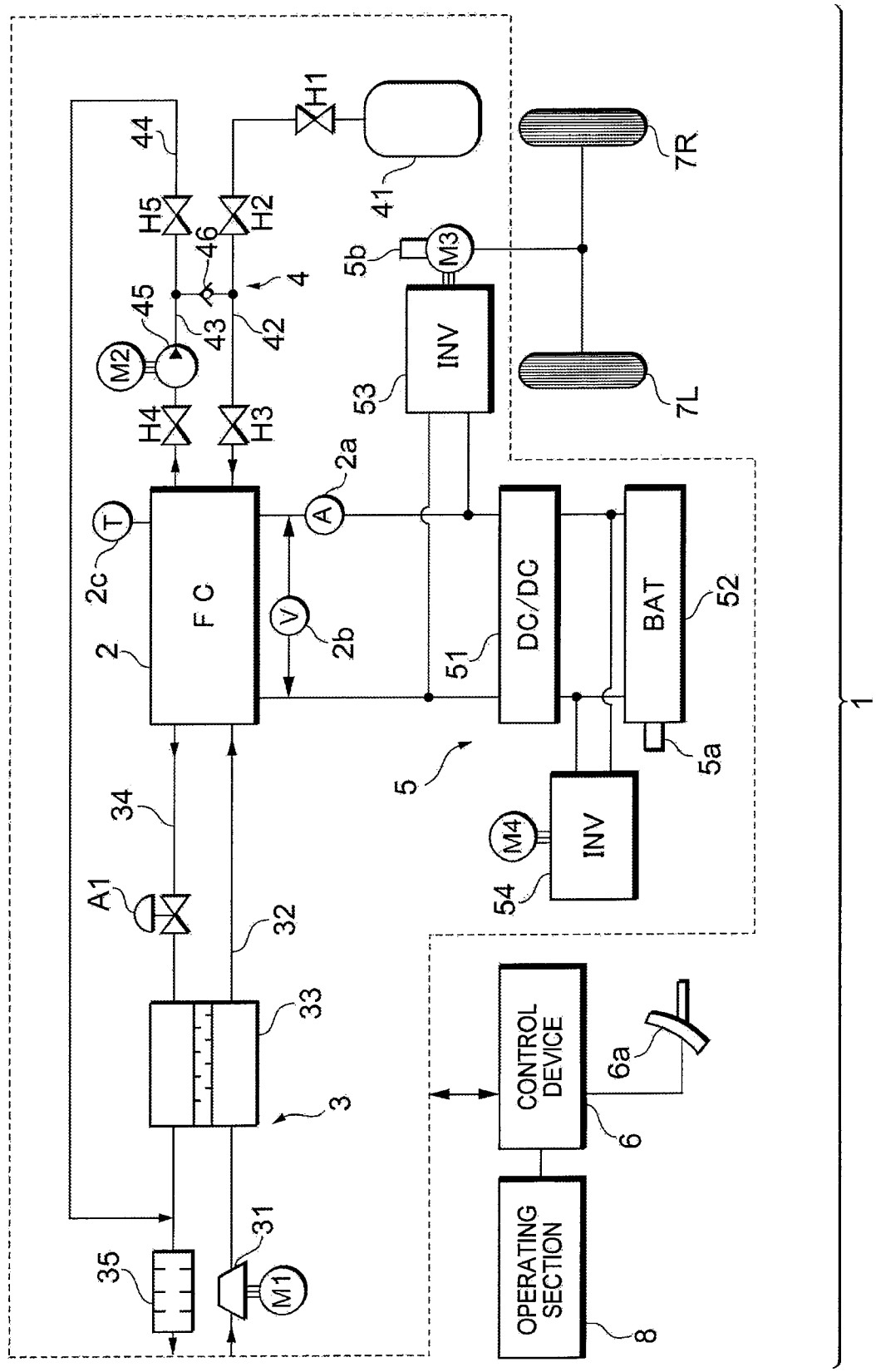
FIG. 1 is a constitution diagram of a fuel cell system according to an embodiment of the present invention.

As shown in FIG. 1, the fuel cell system 1 according to the present embodiment includes a fuel cell 2 which receives the supply of a reactant gas (an oxidizing gas and a fuel gas) to generate electricity; an oxidizing gas piping system 3 which supplies air as the oxidizing gas to the fuel cell 2; a fuel gas piping system 4 which supplies a hydrogen gas as the fuel gas to the fuel cell 2; a power system 5 which charges or discharges the power of the system; a control device 6 which generally controls the whole system and the like.

The fuel cell 2 is constituted of, for example, a solid polymer electrolytic type, and includes a stack structure in which a large number of unitary cells are laminated. Each unitary cell of the fuel cell 2 has a cathode pole (an air pole) on one face of an electrolyte constituted of an ion exchange membrane, an anode pole (a fuel pole) on the other face of the electrolyte, and a pair of separators which sandwich the cathode pole and the anode pole from both sides. A fuel gas is supplied to a fuel gas passage of one separator, the oxidizing gas is supplied to an oxidizing gas passage of the other separator, and the gases supplied in this manner generate electricity in the fuel cell 2. To the fuel cell 2 are attached a current sensor 2a and a voltage sensor 2b for detecting a current and a voltage (an output current and an output voltage) during power generation, and a temperature sensor 2c for detecting a temperature of the fuel cell 2. It is to be noted that as the fuel cell 2, in addition to the solid polymer electrolytic type, any type such as a phosphoric acid type or a dissolving carbonate type may be employed.

The oxidizing gas piping system 3 has an air compressor 31, an oxidizing gas supply path 32, a humidifying module 33, a cathode off gas passage 34, a diluter 35, a motor M1 for driving the air compressor 31 and the like.

The air compressor 31 is driven by a driving force of the motor M1 which operates in accordance with a control command of the control device 6 to supply, to the cathode pole of the fuel cell 2, oxygen (the oxidizing gas) taken from outside air through an air filter (not shown). The oxidizing gas supply path 32 is a gas passage for guiding oxygen supplied from the air compressor 31 to the cathode pole of the fuel cell 2. A cathode off gas is discharged from the cathode pole of the fuel cell 2. In addition to an oxygen off gas used for the cell reaction of the fuel cell 2, the cathode off gas includes pumping hydrogen generated on a cathode pole side and the like. This cathode off gas includes a water content generated by the cell reaction of the fuel cell 2, and hence comes in a high wet state.

The humidifying module 33 performs water content exchange between the oxidizing gas flowing through the oxidizing gas supply path 32 and having a low wet state and the cathode off gas flowing through the cathode off gas passage 34 and having the high wet state, and appropriately humidifies the oxidizing gas supplied to the fuel cell 2. The cathode off gas passage 34 is a gas passage for discharging the cathode off gas from the system, and is provided with an air pressure adjustment valve A1 near a cathode pole outlet of the gas passage. The back pressure of the oxidizing gas supplied to the fuel cell 2 is adjusted by the air pressure adjustment valve A1. The diluter 35 dilutes the discharge concentration of the hydrogen gas in a preset concentration range (a range determined based on an environmental standard or the like). The diluter 35 is connected to the downstream side of the cathode off gas passage 34 and the downstream side of an anode off gas passage 44 described later, and a hydrogen off gas and the oxygen off gas are mixed, diluted and discharged from the system.

The fuel gas piping system 4 has a fuel gas supply source 41, a fuel gas supply path 42, a fuel gas circulation path 43, the anode off gas passage 44, a hydrogen circulation pump 45, a check valve 46, a motor M2 for driving the hydrogen circulation pump 45 and the like.

The fuel gas supply source 41 is means for supplying a fuel gas such as the hydrogen gas to the fuel cell 2, and is constituted of, for example, a high-pressure hydrogen tank, a hydrogen storage tank or the like. The fuel gas supply path 42 is a gas passage for guiding the fuel gas discharged from the fuel gas supply source 41 to the anode pole of the fuel cell 2, and the gas passage is provided with valves such as a tank valve H1, a hydrogen supply valve H2 and an FC inlet valve H3 from the upstream side to the downstream side. The tank valve H1, the hydrogen supply valve H2 and the FC inlet valve H3 are shut valves for supplying (or shutting) the fuel gas to the fuel cell 2, and are constituted of, for example, electromagnetic valves.

The fuel gas circulation path 43 is a return gas passage for returning an unreacted fuel gas to the fuel cell 2, and the gas passage is provided with an FC outlet valve H4, the hydrogen circulation pump 45 and the check valve 46, respectively, from the upstream side to the downstream side. The low-pressure unreacted fuel gas discharged from the fuel cell 2 is appropriately pressurized by the hydrogen circulation pump 45 driven by the driving force of the motor M2 which operates in accordance with the control command of the control device 6, and the gas is guided to the fuel gas supply path 42. The counter flow of the fuel gas from the fuel gas supply path 42 to the fuel gas circulation path 43 is suppressed by the check valve 46. The anode off gas passage 44 is a gas passage for discharging, from the system, the anode off gas discharged from the fuel cell 2 and including the hydrogen off gas, and the gas passage is provided with a purge valve H5.

The power system 5 includes a high-voltage DC/DC converter 51, a battery 52, a traction inverter 53, an auxiliary machine inverter 54, a traction motor M3, an auxiliary machine motor M4 and the like.

The high-voltage DC/DC converter 51 is a direct-current voltage converter, and has a function of regulating a direct-current voltage input from the battery 52 to output the voltage to a traction inverter 53 side, and a function of regulating a direct-current voltage input from the fuel cell 2 or the traction motor M3 to output the voltage to the battery 52. These functions of the high-voltage DC/DC converter 51 realize the charging/discharging of the battery 52. Moreover, the high-voltage DC/DC converter 51 controls the output voltage of the fuel cell 2.

The battery 52 is a chargeable/dischargeable secondary battery, and is constituted of any type of secondary battery (e.g., a nickel hydrogen battery or the like). The battery 52 can charge a surplus power or subsidiarily supply the power by the control of a battery computer (not shown). The pressure of a part of the direct-current power generated by the fuel cell 2 is raised/lowered by the high-voltage DC/DC converter 51 to charge the battery 52. To the battery 52 is attached an SOC sensor 5a which detects a state of charge (SOC) of the battery 52. It is to be noted that instead of the battery 52, a chargeable/dischargeable condenser (e.g., a capacitor) other than the secondary battery may be employed.

The traction inverter 53 and the auxiliary machine inverter 54 are pulse width modulation type PWM inverters which convert the direct-current power output from the fuel cell 2 or the battery 52 in response to the given control command into a three-phase alternate-current power to supply the power to the traction motor M3 and the auxiliary machine motor M4. The traction motor M3 is a motor (a vehicle driving motor) for driving wheels 7L, 7R, and is one embodiment of a load power source in the present invention. To the traction motor M3 is attached a rotation number detection sensor 5b which detects the rotation number of the motor. The auxiliary machine motor M4 is a motor for driving any type of auxiliary machine, and generically refers to the motor M1 for driving the air compressor 31, the motor M2 for driving the hydrogen circulation pump 45 and the like.

The control device 6 is constituted of a CPU, an ROM, an RAM and the like, and generally controls each unit of the system based on each input sensor signal. Specifically, the control device 6 calculates an output demand power of the fuel cell 2 based on the sensor signals sent from an accelerator pedal sensor 6a which detects an accelerator pedal open degree, the SOC sensor 5a, the rotation number detection sensor 5b and the like. Then, the control device 6 controls the output voltage and the output current of the fuel cell 2 so as to generate the output power corresponding to this output demand power. Moreover, the control device 6 controls an output pulse width and the like of the traction inverter 53 and the auxiliary machine inverter 54 to control the traction motor M3 and the auxiliary machine motor M4.

Moreover, the control device 6 detects the temperature of the fuel cell 2 based on the sensor signal output from the temperature sensor 2c provided in the fuel cell 2, and compares the detected temperature with a predetermined reference temperature to judge whether or not warm-up is necessary. Furthermore, the control device 6 performs normal operation processing, in a case where the temperature of the fuel cell 2 exceeds the reference temperature and the device judges that the warm-up is unnecessary. Here, the normal operation processing is the processing to perform the operation at a highly efficient operation point (i.e., the operation point having an only small power loss) without performing the warm-up. On the other hand, the control device 6 performs low-efficiency operation processing (the processing to perform the operation at an operation point with a low power generation efficiency), in a case where the temperature of the fuel cell 2 is the reference temperature or less and the device judges that the warm-up is necessary.

Here, a relation between the normal operation and the low-efficiency operation will be described with reference to FIGS. 2A and 2B.

Figure 2A:
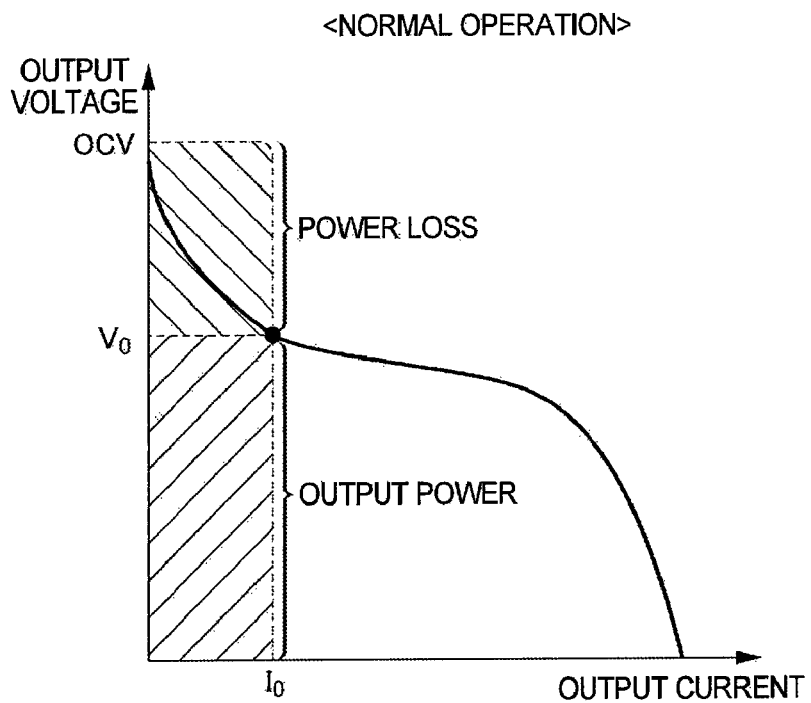
FIG. 2A is an explanatory view showing a relation between an output power and a power loss during a normal operation of the fuel cell system shown in FIG. 1.
Figure 2B:
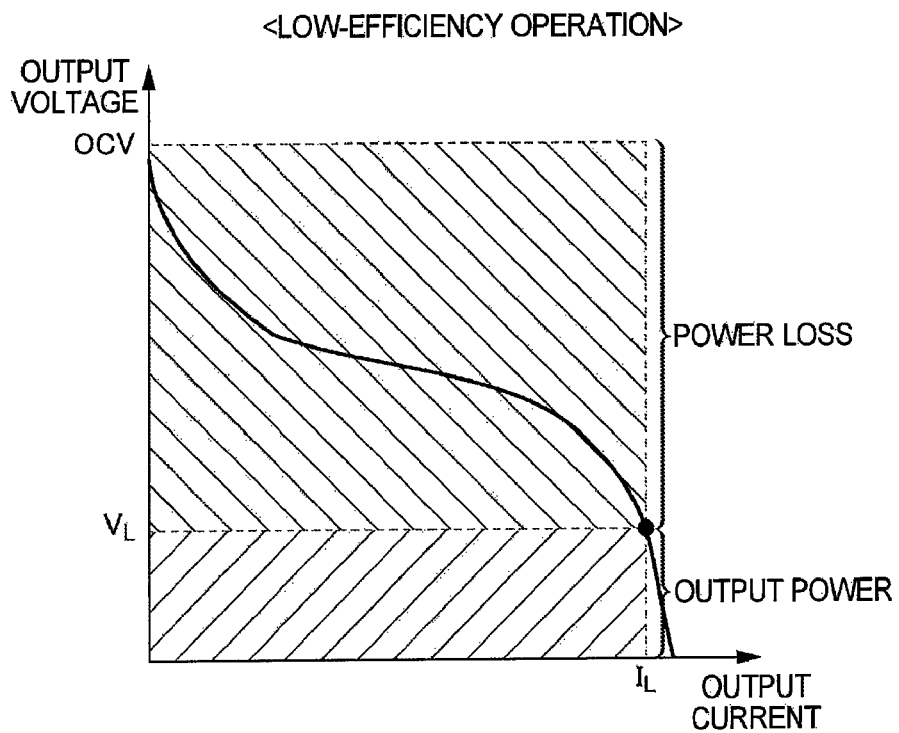
FIG. 2B is an explanatory view showing a relation between the output power and the power loss during a low-efficiency operation of the fuel cell system shown in FIG. 1.

In FIGS. 2A and 2B, the abscissa indicates the output current, and the ordinate indicates the output voltage, respectively, and an open circuit voltage (OCV) is a voltage in a state in which any current is not allowed to flow through the fuel cell 2. Generally in the fuel cell 2 capable of obtaining current/voltage characteristics (IV characteristics) shown in FIG. 2A (2B), as shown in FIG. 2A, the control device 6 performs the operation at a normal operation point ($I_0$, $V_0$) at which the power loss is small with respect to the output voltage. On the other hand, when a warm-up operation is performed, as shown in FIG. 2B, the control device 6 performs the operation at a low-efficiency operation point ($I_L$, $V_L$) with a large power loss, to raise the internal temperature of the fuel cell 2. In a process of performing such a low-efficiency operation, as to energy which can be taken by a reaction between hydrogen and oxygen, a power loss content (thermal energy) can positively be increased, so that quick warm-up can be realized.

Figure 3:
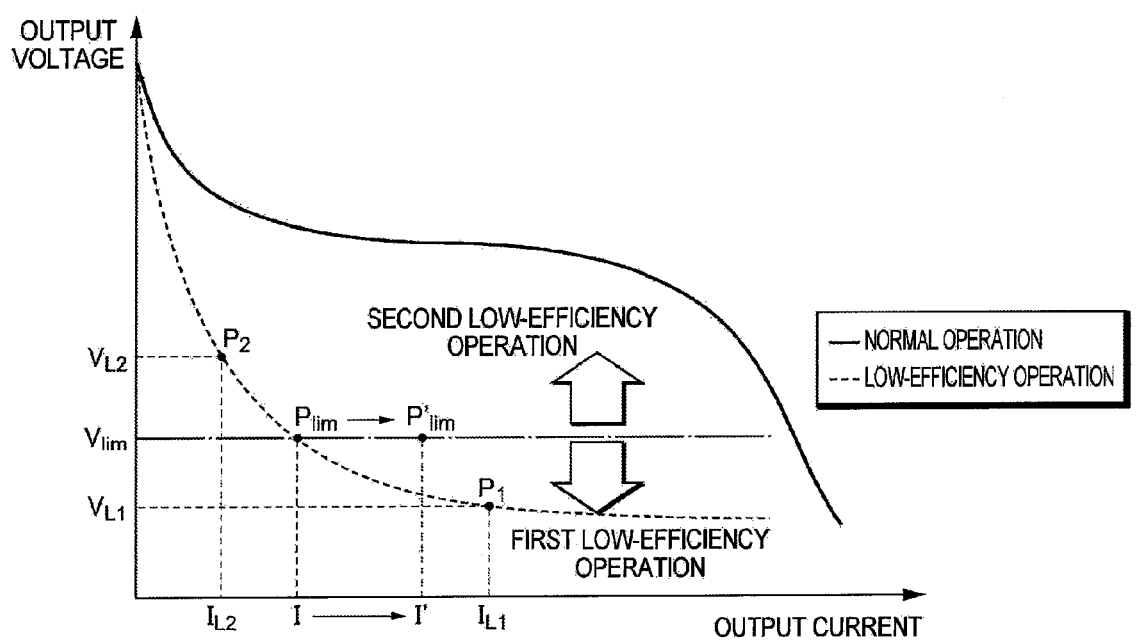
FIG. 3 is an IV characteristic map during the normal operation and the low-efficiency operation of the fuel cell system shown in FIG. 1.

It is to be noted that FIG. 3 shows an IV characteristic map (a solid line) during the normal operation and an IV characteristic map (a broken line) during the low-efficiency operation, and the operation points can be determined during the normal operation and the low-efficiency operation by use of these IV characteristic maps. The IV characteristic map (the broken line) during the low-efficiency operation can appropriately be set in accordance with the output demand from the traction motor M3, and FIG. 3 shows one example of the map.

Moreover, the control device 6 realizes two types of low-efficiency operations. Specifically, in a case where the control device 6 judges that there is not any output demand from the traction motor M3, the device realizes the low-efficiency operation (a first low-efficiency operation) which does not involve the positive driving control of the traction motor M3. On the other hand, in a case where the control device 6 judges that there is the output demand from the traction motor M3, the device realizes the low-efficiency operation (a second low-efficiency operation) involving the positive driving control of the traction motor M3. That is, the control device 6 is one embodiment of control means in the present invention.

Furthermore, the control device 6 calculates the output voltage of the fuel cell 2 required at minimum for driving the traction motor M3 (the minimum drive voltage: e.g., $V_{lim}$ shown in FIG. 3) based on the back electromotive voltage constant, the rotation number, the maximum output and the like of the traction motor M3. Moreover, as shown by an operation point $P_1$ of FIG. 3, the control device 6 sets the output voltage ($V_{L1}$) of the fuel cell 2 in the first low-efficiency operation to a value less than the minimum drive voltage ($V_{lim}$). On the other hand, as shown by an operation point $P_2$ of FIG. 3, the control device 6 sets the output voltage ($V_{L2}$) of the fuel cell 2 in the second low-efficiency operation to a value not smaller than the minimum drive voltage ($V_{lim}$). In the second low-efficiency operation, for example, as shown by an operation point $P_{lim}$ (I, $V_{lim}$) of FIG. 3, the output voltage of the fuel cell 2 is preferably set to a value equal to the minimum drive voltage.

Moreover, the control device 6 changes the output power while keeping the output voltage of the fuel cell 2 at a constant value (the minimum drive voltage), when the output demand from the traction motor M3 changes during the second low-efficiency operation. For example, when the output demand from the traction motor M3 changes from $P_{lim}$ to $P_{lim}'$, the control device 6 changes the output current from I to I' while keeping the output voltage of the fuel cell 2 at the minimum drive voltage $V_{lim}$ as shown in FIG. 3.

Furthermore, the control device 6 judges the presence of the output demand from the traction motor M3 based on a signal sent from an operating section 8 (selection means) constituted of a shift lever or the like for selecting the operation mode of the traction motor M3 (P: a parking mode, R: a reverse mode, N: a neutral mode, D: a drive mode, B: a regenerative brake mode). Specifically, in a case where the control device 6 receives a signal indicating that the operation mode of the traction motor M3 selected by the operating section 8 is the parking mode (P) or the neutral mode (N), the device judges that there is not any output demand from the traction motor M3 to realize the first low-efficiency operation. On the other hand, in a case where the control device 6 receives a signal indicating that the operation mode of the traction motor M3 selected by the operating section 8 is the reverse mode (R), the drive mode (D) or the regenerative brake mode (B), the device judges that there is the output demand from the traction motor M3 to realize the second low-efficiency operation.

It is to be noted that when the back electromotive voltage of the traction motor M3 is larger than a predetermined reference voltage (e.g., the system voltage during the second low-efficiency operation) and the control device 6 stops the control of the traction inverter 53, the back electromotive power of the traction motor M3 acts on the traction inverter 53. In consequence, even in a case where the control device 6 receives the signal indicating that the operation mode of the traction motor M3 selected by the operating section 8 is the parking mode (P) or the neutral mode (N), when the back electromotive voltage of the traction motor M3 is larger than the predetermined reference voltage, the device continues the driving control of the traction motor M3 (the control of the traction inverter 53). In the present embodiment, the control device 6 calculates the back electromotive power of the traction motor M3 based on information or the like associated with the rotation number of the traction motor M3 sent from the rotation number detection sensor 5b.

Figure 4:
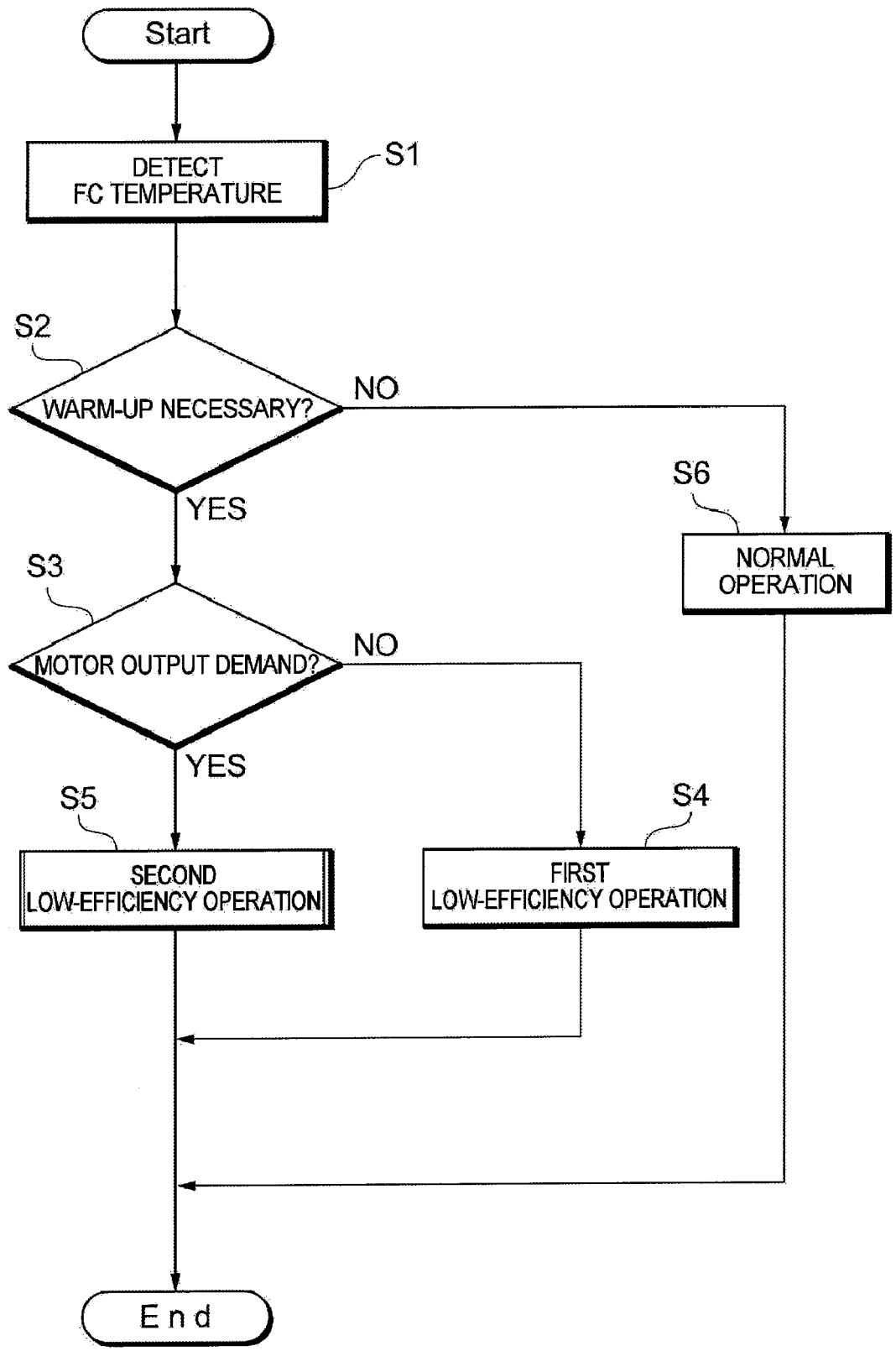
FIG. 4 is a flow chart for explaining an operation method of the fuel cell system shown in FIG. 1.
Figure 5:
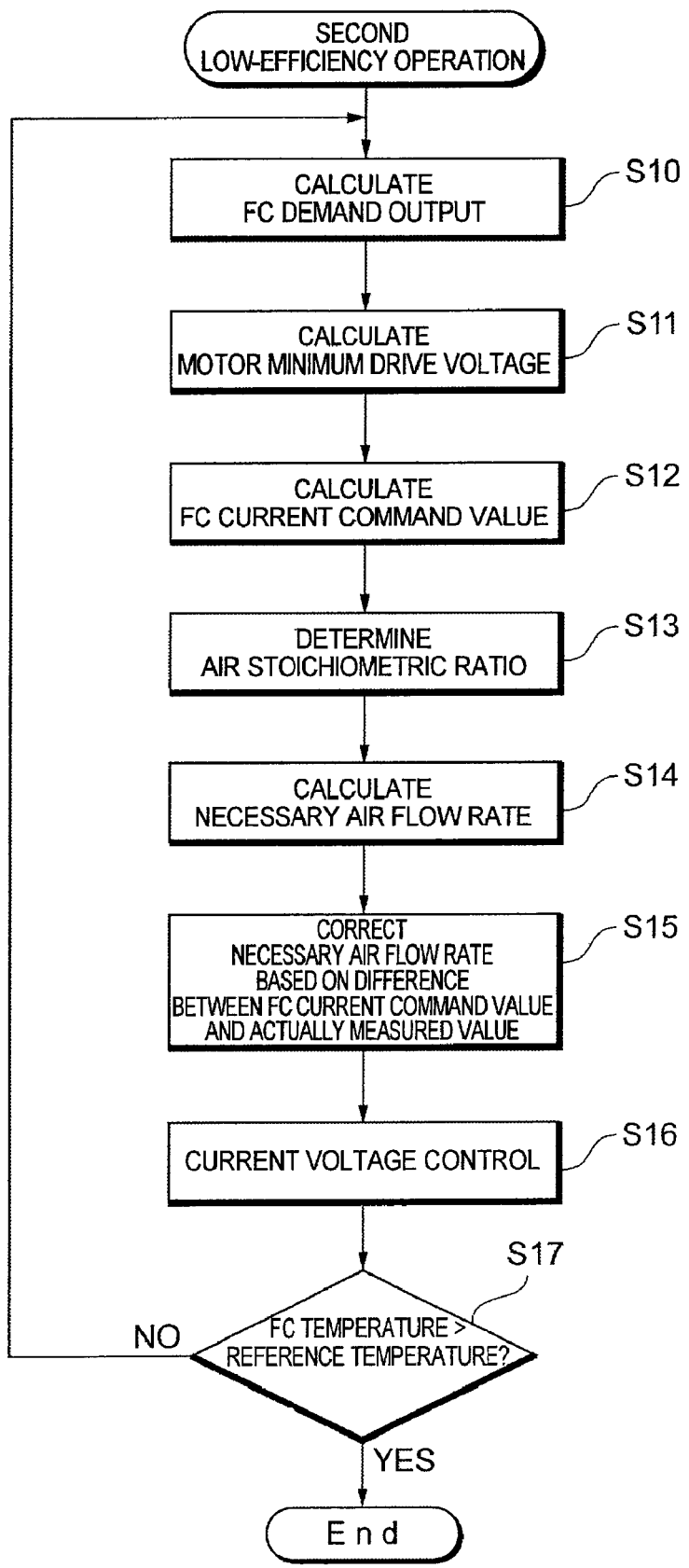
FIG. 5 is a flow chart for explaining a second low-efficiency operation of the fuel cell system shown in FIG. 1.

Next, the operation method of the fuel cell system 1 according to the present embodiment will be described with reference to flow charts of FIGS. 4 and 5.

First, the control device 6 detects the temperature of the fuel cell 2 based on the sensor signal output from the temperature sensor 2c (a temperature detection step: S1), and compares the detected temperature with the predetermined reference temperature to judge whether or not the warm-up is necessary (a warm-up judgment step: S2). In the warm-up judgment step S2, when the temperature of the fuel cell 2 exceeds the reference temperature and the control device 6 judges that the warm-up is unnecessary, the device realizes the normal operation (a normal operation step: S6). On the other hand, in the warm-up judgment step S2, when the temperature of the fuel cell 2 is the reference temperature or less and the control device 6 judges that the warm-up is necessary, the device judges the presence of the output demand from the traction motor M3 (an output demand judgment step: S3).

In the output demand judgment step S3, in a case where the control device 6 judges that there is not any output demand from the traction motor M3, the device realizes the first low-efficiency operation (a first low-efficiency operation step: S4). In the first low-efficiency operation step S4, the control device 6 sets a target operation point, that is, targeted output current command value and output voltage command value (e.g., the operation point $P_1$ ($I_{L1}$, $V_{L1}$) shown in FIG. 3). In this case, the control device 6 sets the output voltage command value of the fuel cell 2 to a value less than the minimum drive voltage of the traction motor M3 (e.g., $V_{lim}$ in FIG. 3). Then, the control device 6 performs control to bring the output voltage of the fuel cell 2 detected by the voltage sensor 2b close to the output voltage command value by use of the high-voltage DC/DC converter 51, and the device decreases an amount of air to be supplied to the fuel cell 2 by use of the air compressor 31 or the air pressure adjustment valve A1, thereby performing control to bring the output current of the fuel cell 2 detected by the current sensor 2a close to the output current command value. The control device 6 ends the first low-efficiency operation, when the temperature of the fuel cell 2 exceeds the predetermined reference temperature.

On the other hand, in the output demand judgment step S3, in a case where the control device 6 judges that there is the output demand from the traction motor M3, the device realizes the second low-efficiency operation (a second low-efficiency operation step: S5). Here, the second low-efficiency operation step S5 will be described with reference to a flow chart of FIG. 5.

First, the control device 6 calculates the output demand power of the fuel cell 2 based on the sensor signals sent from the SOC sensor 5a, the rotation number detection sensor 5b and the like (an output demand calculation step: S10). Subsequently, the control device 6 calculates the minimum drive voltage (e.g., $V_{lim}$ in FIG. 3) of the traction motor M3 as the output voltage command value based on the back electromotive voltage constant, the rotation number, the maximum output and the like of the traction motor M3 (a voltage command value calculation step: S11).

Subsequently, the control device 6 calculates the output current command value based on the IV characteristic map corresponding to the output demand power calculated in the output demand calculation step S10 and the minimum drive voltage (the output voltage command value) calculated in the voltage command value calculation step S11 (a current command value calculation step: S12). For example, the control device 6 calculates the output current command value I based on the IV characteristic map shown by the broken line of FIG. 3 and the calculated minimum drive voltage $V_{lim}$. In consequence, the operation point $P_{lim}$ (I, $V_{lim}$) during the second low-efficiency operation is determined.

It is to be noted that when the value of the minimum drive voltage calculated in the voltage command value calculation step S11 is excessively small, it is supposed that the output current command value calculated in the current command value calculation step S12 is excessively large. Therefore, the control device 6 sets an upper limit value ($I_{lim}$) to the output current command value, and automatically shifts the operation point during the second low-efficiency operation to the operation point including the upper limit value ($I_{lim}$) of the output current command value, when the calculated output current command value exceeds this upper limit value ($I_{lim}$). The output voltage command value (V) of the shifted operation point is a value (a value larger than the minimum drive voltage) calculated based on the IV characteristic map corresponding to the output demand power calculated in the output demand calculation step S10 and the upper limit value ($I_{lim}$) of the output current command value.

After determining the output current command value through this current command value calculation step S12, the control device 6 determines an air stoichiometric ratio based on the determined output current command value (a stoichiometric ratio determination step: S13). Here, the air stoichiometric ratio is an excess ratio of the actual air supply amount with respect to a theoretical air supply amount required for generating the output current. In the present embodiment, the air stoichiometric ratio is determined based on a specific map indicating a relation between the output current command value and the air stoichiometric ratio.

Subsequently, the control device 6 calculates the flow rate (a necessary air flow rate) of the oxidizing gas to be supplied to the fuel cell 2 based on the air stoichiometric ratio determined in the stoichiometric ratio determination step S13 (an air flow rate calculation step: S14). In the present embodiment, the air stoichiometric ratio is substituted into a specific formula to calculate the necessary air flow rate. Subsequently, the control device 6 compares the output current command value calculated in the current command value calculation step S12 with the output current value (an actually measured value) detected by the current sensor 2a to calculate a difference, and corrects the necessary air flow rate based on the calculated difference (an air flow rate correction step: S15).

Subsequently, the control device 6 calculates the rotation number of the air compressor 31 based on the necessary air flow rate corrected in the air flow rate correction step S15, drives and controls the motor M2 of the air compressor 31 by use of this rotation number as a commanded rotation number to control the current of the fuel cell 2, and performs voltage control to bring the output voltage of the fuel cell 2 detected by the voltage sensor 2b close to the output voltage command value by use of the high-voltage DC/DC converter 51 (a current voltage control step: S16).

Afterward, the control device 6 judges, based on the sensor signal supplied from the temperature sensor 2c, whether or not the detected temperature of the fuel cell 2 exceeds the reference temperature, that is, whether or not the warm-up may be ended (a warm-up end judgment step: S17). In a case where the control device 6 judges that the temperature of the fuel cell 2 does not exceed the reference temperature, to continue the warm-up of the system, the device returns to the output demand calculation step S10 where the above series of processing is repeatedly executed. On the other hand, in a case where the control device 6 judges that the temperature of the fuel cell 2 exceeds the reference temperature, the device judges that the warm-up is not required any more, thereby ending the above-mentioned processing.

In the fuel cell system 1 according to the above-mentioned embodiment, the low-efficiency operation (the second low-efficiency operation) can be realized to set the output voltage of the fuel cell 2 to a value not smaller than the minimum drive voltage ($V_{lim}$) of the traction motor M3 (the load power source). Therefore, even during the warm-up by the low-efficiency operation, the traction motor M3 can securely be driven. In consequence, both the warm-up and the run of the vehicle can be realized.

Moreover, in the fuel cell system 1 according to the above embodiment, since the output voltage of the fuel cell 2 during the second low-efficiency operation can be set to the minimum drive voltage ($V_{lim}$) of the traction motor M3, the maximum temperature raising effect in the second low-efficiency operation can be obtained while securing the power for driving the traction motor M3.

Furthermore, in the fuel cell system 1 according to the above embodiment, even when the output power of the fuel cell 2 is changed in accordance with the change of the output demand from the traction motor M3 during the second low-efficiency operation, the output voltage of the fuel cell 2 can be kept constant. Therefore, the generation of the charging/discharging due to the change of the output voltage of the fuel cell 2 can be suppressed, whereby the precision of the output power control of the fuel cell 2 can be improved. Moreover, even when the output demand from the traction motor M3 changes, the output voltage of the fuel cell 2 can be kept at the minimum drive voltage ($V_{lim}$) as it is, so that the maximum temperature raising effect by the second low-efficiency operation can constantly be obtained.

Additionally, in the fuel cell system 1 according to the above embodiment, when there is not any output demand from the traction motor M3, the low-efficiency operation (the first low-efficiency operation) can be realized to set the output voltage of the fuel cell 2 to a value less than the minimum drive voltage ($V_{lim}$) of the traction motor M3. Therefore, the warm-up can efficiently be performed by effectively using the power energy used for driving the motor as the thermal energy, and a temperature raising time can be shortened.

Moreover, in the fuel cell system 1 according to the above embodiment, even in a case where the operation mode of the traction motor M3 is the parking mode (P) or the neutral mode (N), when the back electromotive voltage of the traction motor M3 is larger than the predetermined reference voltage (e.g., the system voltage during the second low-efficiency operation), the driving control of the traction motor M3 can be continued. In consequence, the damage of the traction inverter 53 due to the back electromotive voltage of the traction motor M3 or the like can be suppressed.

It is to be noted that in the above embodiment, there has been described the low-efficiency operation for allowing the fuel cell 2 to generate the electricity in a state in which the oxidizing gas to be supplied to a cathode is decreased, but instead of this operation (or in addition to this operation), a low-efficiency operation may be employed for allowing the fuel cell 2 to generate the electricity in a state in which the fuel gas to be supplied to an anode is decreased.

Moreover, in the above embodiment, an example has been described in which the low-efficiency operation is performed for a purpose of the warm-up when the temperature of the fuel cell 2 lowers, but the low-efficiency operation may be performed, in a case where the catalyst activity of the fuel cell 2 is recovered or it is detected that the electrode catalyst of the fuel cell 2 is poisoned.

Furthermore, in the above embodiment, by using the temperature sensor 2c attached to the fuel cell 2, the temperature of the fuel cell 2 is detected to judge whether or not the warm-up is necessary, but it may be judged whether or not the warm-up is necessary, by detecting an outside air temperature or a component temperature around the fuel cell instead of the temperature of the fuel cell 2.

Additionally, in the above embodiment, an example has been described in which the vehicle driving motor (the traction motor M3) is employed as the load power source, but the load power source is not limited to this example, and there may be employed any type of power source for receiving the supply of the electricity from the fuel cell to operate and generate the power.

Moreover, in the above embodiment, an example has been described in which the operating section 8 constituted of the shift lever or the like is employed as the selection means, but the selection means is not limited to this example. Furthermore, in the above embodiment, an example has been described in which when the operation mode selected by the operating section 8 is P or N, it is judged that there is not any output demand from the motor to realize the first low-efficiency operation, whereas when the operation mode selected by the operating section 8 is R, D or B, it is judged that there is the output demand from the motor to realize the second low-efficiency operation, but a method for judging the output demand from the motor is not limited to this example.

Industrial Applicability

As described in the above embodiment, a fuel cell system according to the present invention can be mounted on a fuel cell vehicle, and may be mounted on any type of mobile body (a robot, a ship, an airplane or the like) other than the fuel cell vehicle. Moreover, the fuel cell system according to the present invention may be applied to a stational power generation system which is used as a power generation facility for a construction (a housing, a building or the like).

The invention claimed is:

1. A fuel cell system comprising:
a fuel cell which generates electricity; and
a control device programmed to supply an output power from the fuel cell to a predetermined load power source while realizing a low-efficiency operation of the fuel cell by operating the fuel cell at an operation point with a power loss, the power loss being larger than that at a normal operation point of the fuel cell, thereby driving and controlling the load power source,
wherein the control device is programmed to set the output voltage of the fuel cell during the low-efficiency operation to a value not smaller than the minimum drive voltage of the load power source.

2. The fuel cell system according to claim 1, wherein the control device is programmed to set the output voltage of the fuel cell during the low-efficiency operation to the minimum drive voltage of the load power source.

3. The fuel cell system according to claim 2, wherein the control device is programmed to control the output power of the fuel cell in response to an output demand from the load power source, and changes the output power while keeping a constant output voltage of the fuel cell in a case where the output demand from the load power source changes.

4. The fuel cell system according to claim 1, wherein the control device is programmed to set the output voltage of the fuel cell to a value less than the minimum drive voltage of the load power source to realize the low-efficiency operation in a case where it is judged that there is not any output demand from the load power source.

5. The fuel cell system according to claim 4, wherein the load power source is a motor for driving a vehicle, and wherein the system includes a selection device that selects an operation mode of the vehicle driving motor, and wherein the control device judges that there is not any output demand from the vehicle driving motor, when the operation mode of the vehicle driving motor selected by the selection device is a neutral mode or a parking mode.

6. The fuel cell system according to claim 5, wherein the control device is programmed to continue to drive and control the vehicle driving motor, when the operation mode of the vehicle driving motor selected by the selection device is a neutral mode or a parking mode and a back electromotive voltage of the vehicle driving motor is larger than a predetermined reference voltage.

7. An operation method of a fuel cell system including a fuel cell which generates electricity, the method comprising:
a step of supplying an output power from the fuel cell to a predetermined load power source while realizing a low-efficiency operation of the fuel cell, thereby driving and controlling the load power source by operating the fuel cell at an operation point with a power loss, the power loss being larger than that at a normal operation point of the fuel cell,
wherein the step sets the output voltage of the fuel cell during the low-efficiency operation to a value not smaller than the minimum drive voltage of the load power source.

* * * * *